United States Patent [19]

Gramlich et al.

[11] Patent Number: 5,095,423

[45] Date of Patent: Mar. 10, 1992

[54] LOCKING MECHANISM FOR THE PREVENTION OF RACE CONDITIONS

[75] Inventors: Wayne C. Gramlich, Sunnyvale; Soren J. Tirfing, Palo Alto, both of Calif.

[73] Assignee: Sun Microsystems, Inc., Mountain View, Calif.

[21] Appl. No.: 500,140

[22] Filed: Mar. 27, 1990

[51] Int. Cl.[5] .............................................. G06F 15/40
[52] U.S. Cl. ..................... 395/600; 364/282.1; 364/283.1; 364/283.2; 364/228; 364/DIG. 1
[58] Field of Search ... 364/200 MS File, 900 MS File

[56] References Cited

U.S. PATENT DOCUMENTS

| | | | |
|---|---|---|---|
| 4,611,272 | 9/1986 | Lomet | 364/200 |
| 4,827,462 | 5/1989 | Flannagan et al. | 369/32 |
| 4,945,475 | 7/1990 | Bruffey et al. | 364/200 |
| 5,008,853 | 4/1991 | Bly et al. | 364/900 |
| 5,010,495 | 4/1991 | Willetts | 364/513.5 |
| 5,014,192 | 5/1991 | Mansfield et al. | 364/200 |

OTHER PUBLICATIONS

"Database: A Primer—C. J. Date", 1983, pp. 165-175.

Primary Examiner—Michael R. Fleming
Assistant Examiner—Gopal C. Ray
Attorney, Agent, or Firm—Blakely Sokoloff Taylor & Zafman

[57] ABSTRACT

A file system locking mechanism is provided which prevents the errors which arise when race conditions occur in a multitasking system. Atomic operators are utilized to perform certain operations for the creation and renaming of files and directories in the file system wherein if a race condition occurs, the atomic operations fail and the file creation process is halted to a predetermined state whereby the errors which occur during race conditions are prevented.

7 Claims, 16 Drawing Sheets

```
#include <stdio.h>
main ()
{
    printf ("Hello world\n");
}
```

Figure 3a

```
.sb/NewRoot:
total 3
drwxrwxr-x   2 soren    512 Sep 27 16:32 .
drwxrwxr-x   4 soren    512 Sep 27 16:32 ..
-rw-rw-rw-   1 soren    288 Sep 27 16:32 foo.2rBQsT.bd
-rw-rw-r--   1 soren    628 Sep 27 16:32 foo.c.luoYuw.bd
-rw-rw-r--   1 soren   2496 Sep 27 16:32 stdio.h.OyPdOs.bd
```

Figure 3b

```
**** Header section (id=1, start=0, length=124)
Magic number = 0x3c63623e '<cb>'
.bd format version number = 2,1
#line seen in source = 0
case was folded = 0
Language: 'sun_c' - version 1,1
Source type = root (1)
Number of sections = 6
Header section, id=1, start=0, length=124
Source name section, id=2, start=124, length=16
Refd files section, id=3, start=140, length=16
Symbol table section, id=4, start=156, length=332
Semantic table section, id=5, start=488, length=120
Line id section, id=6, start=608, length=20
**** Source name section (id=2, start=124, length=16)
relative=1 /tmp/foo.c
**** Refd files section (id=3, start=140, length=16)
hash=OyPdOS stdio.h
****Symbol table section (id=4, start=156, length=332)
 156: ' F F main 2 5' @ 488
 180: ' P main' @ 496
 196: 'printf' @ 504
 212: ' F S /tmp/foo.c 0 .' @ 512
 240: '"Hello world\n"' @ 520
 264: ' N #180/foo.c' @ 528
 288: '<stdio.h>' @ 536
 308: 'main' @ 544
 320: ' F G sun_c 0 .' @ 552
 344: ' AF main printf' @ 560
 368: ' P #180/foo.c' @ 568
 392: ' AI #180/foo.c #49c/stdio.h' @ 576
 428: ' AI foo.o #180/foo.c' @ 584
 456: ' N main' @ 592
 472: ' N foo.o' @ 600
```                                    ⎤
                                       │
                                       │ 400
                                       │
                                       ⎦
```
**** Semantic table section (id=5, start=488, length=120)
 488: Name ref @ 1. ' F F main 2 5' 25 cb_focus_function_unit
 492: End rec
 496: Name ref @ 2. ' P main' 65 cb_grapher_function_property
 500: End rec
 504: Name ref @ 4. 'printf' 192 cb_c_def_global_proc_implicit
 508: End rec
 512: Name ref @ 1. ' F S /tmp/foo.c 0 .' 23 cb_focus_file_unit
 516: Enc rec
 520: Name ref @ 4. '"Hellow world\n"' 213 cb_c_regular_string
 524: Enc rec
 528: Name ref @ 1. ' N #180/foo.c' 72 cb_grapher_source_file_node
 532: Enc rec
 536: Name ref @ 1. '<stdio.h>' 56 cb_cpp_included_file_name_system
 540: Enc rec
 544: Name ref @ 2. 'main' 178 cb_c_def_global_func_w_body
 548: Enc rec
 552: Name ref @ 1. ' F G sun_c 0.' 30 cb_focus_language_unit
 556: Enc rec
 560: Name ref @ 4. ' AF main printf' 64 cb_grapher_function_call_arc
 564: Enc rec
 568: Name ref @ 1. ' P #180/foo.c' 73 cb_grapher_source_file_property
 572: Enc rec
 576: Name ref @ 1. ' AI #180/foo.c #49c/stdio.h' 69 cb_grapher_source_source_file_
 580: Enc rec
 584: Name ref @ 1. ' AI foo.o #180/foo.c" 66 cb_grapher_executable_object_file_arc
 588: Enc rec
 592: Name ref @ 2. ' N main' 61 cb_grapher_function_regular_call_node
 596: Enc rec
 600: Name ref @ 1. ' N foo.o' 71 cb_grapher_object_file_node
 604: Enc rec
```                                    ⎤
                                       │
                                       │ 410
                                       │
                                       ⎦
```
**** Line id section (id=6, start=608, length=20)
Line 1 length=18 hash=1626 inactive=0
Line 2 length=6 hash=502 inactive=0
Line 3 length=1 hash=123 inactive=0
Line 4 length=25 hash=2162 inactive=0
Line 5 length=1 hash=125 inactive=0
```                                    ⎤ 420
                                       ⎦

Figure 3c

LOCKING MECHANISM FOR THE PREVENTION OF RACE CONDITIONS

BACKGROUND OF THE INVENTION

1. Field of the Invention

The method and apparatus of the present invention relates to the organization of databases. More specifically, the method and apparatus of the present invention relates to the organization and identification of database files derived from textual source files which form the database and the information contained within the database files for optimum retrieval and storage efficiency of textual files.

2. Related Applications

This application is related to U.S. patent application Ser. No. 07/500,141, filed Mar. 27, 1990, entitled "Method and Apparatus for Searching Database Component Files to Retrieve Information from Modified Files", U.S. patent application Ser. No. 07/500,138, filed Mar. 27, 1990, entitled "User Extensible, Language Sensitive Database System" and U.S. patent application Ser. No. 07/499,639, Filed Mar. 27, 1990, entitled "Method and Apparatus For the Naming of Database Component Files To Avoid Duplication of Files" which are herein incorporated by reference.

3. Art Background

A database is a collection of information which is organized and stored in a predetermined manner for subsequent search and retrieval. Typically, the data is organized in such a manner that the data is indexed according to certain parameters and can be retrieved according to those parameters. Data contained in databases vary according to the applications. For example, a database may contain information to index words in a text file such that words or strings of words in the text file may be retrieved quickly.

The data contained in the database may be organized in a single file or multiplicity of files for access and retrieval. Sometimes the potential for duplications of files occurs because of the nature of the source information from which the database is derived. Thus, if the source information contains duplicate information the data base may similarly contain duplicate information. One application where this occurs is in the environment of computer program compilers and processes which assist in the indexing and retrieval of source file information in text form according to certain compiler information generated during the process of compilation of the source file.

For example, software developers frequently need to review specific lines or sections of a source code program in textual format that contains a certain variable or symbol (hereinafter referred to collectively as "symbols") in order to determine where in the program the symbol occurs and how the value of the symbol changes throughout the execution of the program. One method to provide this capability of search and retrieval is to form a database which contains an index of all the symbols in the source program and the corresponding line numbers in the source files where these symbols appear. However, a source program may be quite large and span not one but a multiplicity of separate files, whereby the files are combined during the compilation process by linking or include statements (such as the "# include" statement in the C programming language) located in the main program. Thus, those files which are frequently used will be included in the database multiple times even though the information contained therein is the same.

There is also a need to insure that the database component files which comprise the database match the current version of the source files from which the database component file is derived. The user may inadvertently modify the textual source files from which the database is derived without updating the database component file. Thus, the database may provide incorrect information for the retrieval of text from the source file.

In a multitasking environment, multiple processes or devices may access or attempt to access files simultaneously. A race condition occurs when one process or device attempts to read or write information to a file while another process or device attempting to write information to the same file. This results in corrupt data being written into the file and/or corrupt data being read out of the file.

SUMMARY OF THE INVENTION

It is therefore an object of the present invention to provide a means for minimizing the duplication of files within a database.

It is an object of the present invention to provide a means for searching for database files and providing the means in certain instances for providing the corresponding portions of the source file when the integrity between the database file and source file is lost.

It is an object of the present invention to provide a means for checking the integrity of the database with the current version of the source file.

It is an object of the present invention to provide a means for preventing errors which arise due to race conditions which occur in a multitasking system.

In the method and apparatus of the present invention a database component file to be added to the database is given a unique name that is dependent upon the contents of the file such that, when the contents of the source file changes, the name of the corresponding database components file to be added to the database also changes. Conversely, if two database component files have identical information contained therein, the same file name will be generated and the duplication of information in the data base is prevented by providing a simple test that checks for the existence of the name of the database component file before the generation and addition of the file to the database. If the file name exists in the database, the information is already contained in the database and the file is not generated and added to the database information.

Preferably the name of the file is generated by computing a hash value from the sum of the contents of the file and concatenating the hash value to the name of the file. Because the source file name is used in conjunction with the hash value to construct the database component file name, the hash value does not have to be unique for all files but only for those source files having the same name. Therefore, the likelihood of conflicts is minimal. In addition, through the selection of heuristic methods for computing the hash value, a high degree of confidence can be maintained that the file names are unique. Furthermore, because the database component file names are unique for each source file, the process of searching for the correct file is simplified and there is no need to specify the locations of database component files, e.g. the directory where the database component file is located, because the file name is unique for a particular component file is located, because the file name is unique for a particular file contents and a query or search program can safely assume that any file with the same name was generated from the same source file.

Each database component file contains information regarding the text contained in one source file which enables the user to quickly determine the frequency of occurrence of the specified text and the location of the specified text in the source file. For each textual word (referred to herein as a "symbol"), an entry in the database component file is provided containing symbol information. The symbol information comprises the symbol name, symbol type and line number in the source file where the symbol is located. Line identification information is also provided which contains the line numbers of the source file, the length of the line, (i.e., the number of characters in the line) and corresponding hash values which are computed from the contents of the line of text in the source file. Before a line of text identified in a query is displayed, the line identification information provides the means to verify that the line of text identified in the symbol information is the same line of text as the one now contained in the source file. The hash value and line length corresponding to the line of text (referenced in the database) is compared to a hash value and line length computed for the text retrieved from the current source file. If the computed hash value and line length does not match the hash value and line length contained in the line identification information, the text does not match the database reference because the source file has been changed subsequent to the generation of the database.

A locking mechanism is also provided which prevents the errors which arise when race conditions occur in a multi-tasking system by using temporary file names and file directories in conjunction with atomic commands.

BRIEF DESCRIPTION OF THE DRAWINGS

The objects, features and advantages of the present invention will be apparent from the following detailed description in which:

FIGS. 3a, 3b and 3c illustrate a source file, the database component file generated therefrom according to a preferred embodiment of the present invention and the contents of the database file.

DETAILED DESCRIPTION OF THE INVENTION

Notation and Nomenclature

The detailed descriptions which follow are presented largely in terms of algorithms and symbolic representations of operations on data bits with a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may provide more convenient to construct more specialized apparatus to perform the required method steps. The required structure for a variety of these machines will appear from the description given below.

General System Configuration

Figure 1:
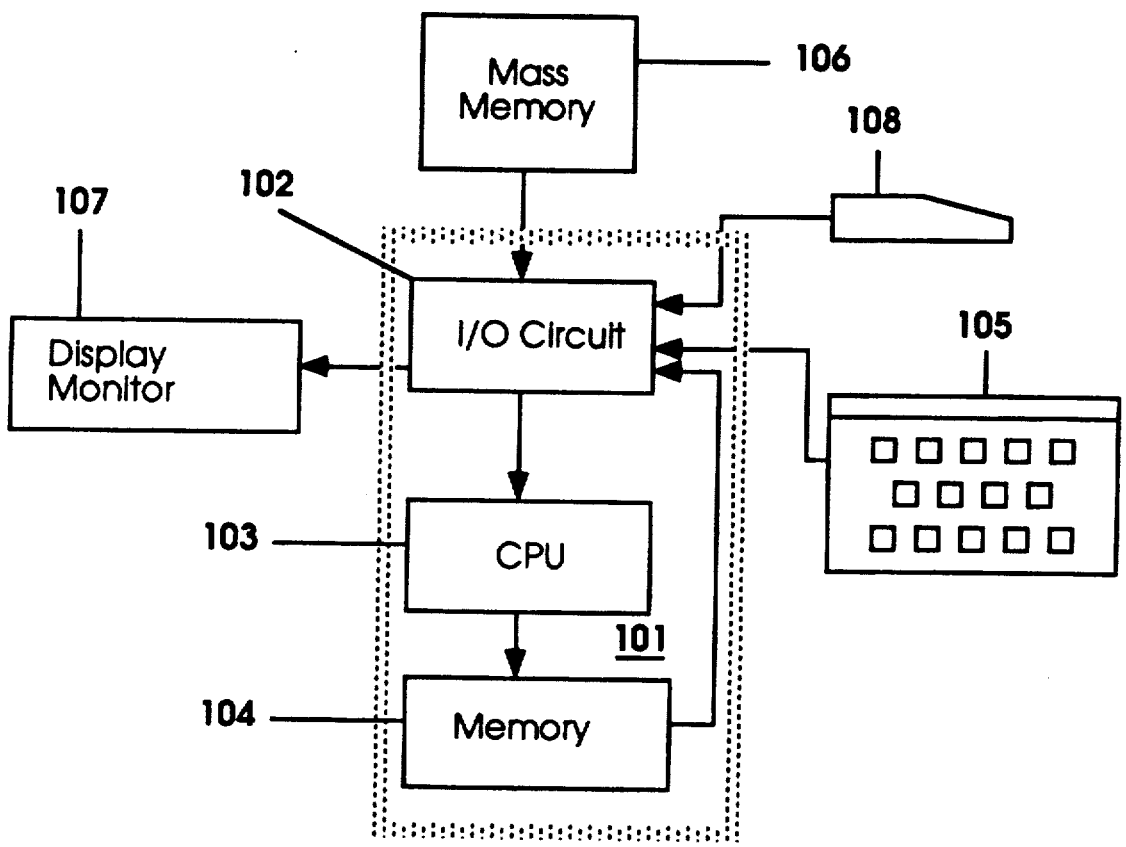
FIG. 1 is a block diagram of an exemplary computer employed in the present invention.

FIG. 1 shows a typical computer-based system for databases according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. A cursor control 108 is used to select command modes and edit the input data, such as, for example, the parameter to query the database, and provides a more convenient means to input information into the system.

Process Description

The following description of a preferred embodiment of the present invention will describe the source files as source code files of computer programs. The means for generating the database files, referred to as the "collector", is described as a part of a compiler which compiles the source code into object code files. It will be evident to one skilled in the art that the present invention may be applied to all types of text files and is not limited to computer program source files. Furthermore, the collector function may be combined with elements that perform other functions, such as the compiler herein described, or the collector may operate as an independent means.

Figure 2:
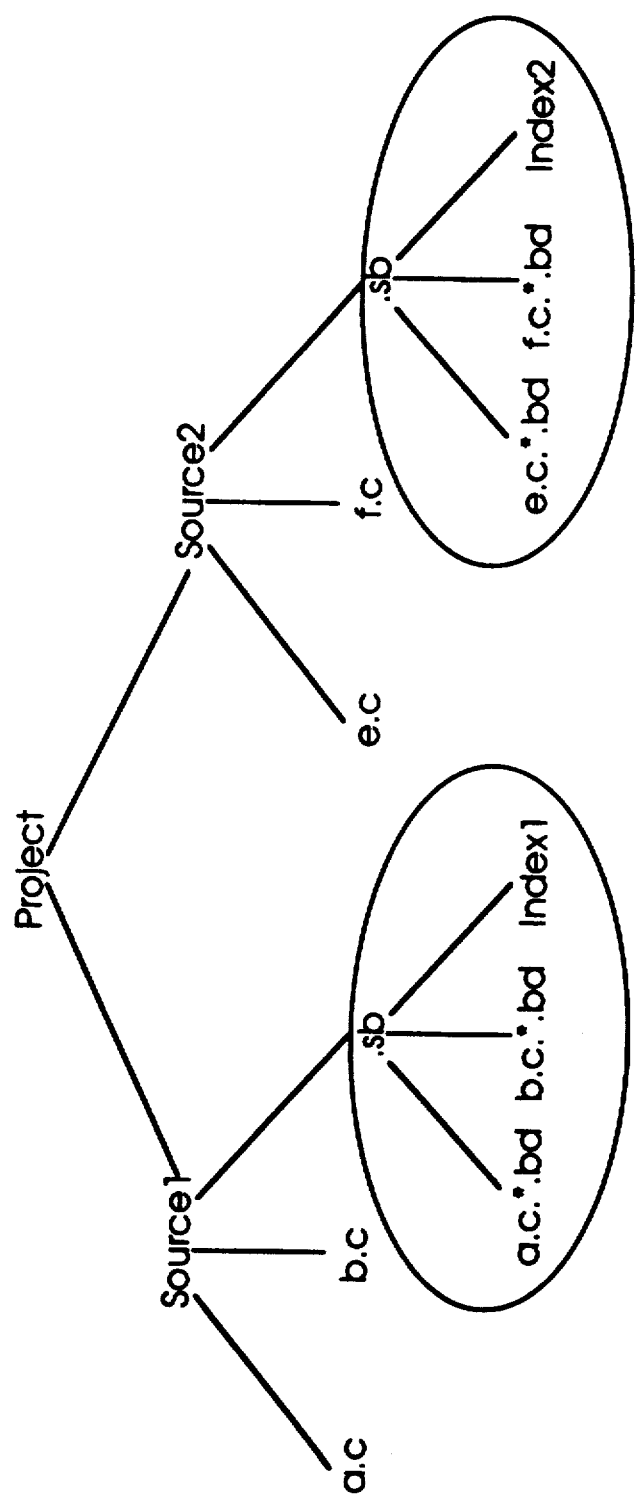
FIG. 2 is illustrative of database component files generated according to the present invention.

Referring to FIG. 2, the database employed to illustrate the present invention is shown. The database comprises at least one database component file (referred to in FIG. 2 as having the suffix ".bd" which represents the term "browser data") and an index file which is used to locate information in the database component files. Each database component file contains the symbol information and line identification information to provide the capability of browsing or searching one source file in response to a query. The symbols in the source text file may comprise every word in the text file or select text which are identified according to the symbol type. The symbols may be categorized and identified according to the type of source file by employing an interface which specifies the identification of the symbols, such as that described in co-pending patent application U.S. Ser. No. 07/500,138, filed Mar. 27, 1990, entitled "User Extensible, Language Sensitive Database System".

A database component file is created for each source file and is stored in the current working file directory. This is illustrated in FIG. 2. Subdirectory Source1 contains source files a.c and b.c. A sub-directory .sb is created which contains database files a.c.database.bd and b.c.database.bd and index file Index1. Sub-directory .sb which is a sub-directory of directory Source2, contains database files e.c.database.bd and f.c.database.bd and index file Index2 which corresponds to source files e.c and f.c contained in directory Source2. As explained in detail below, the "database" in the database file name represents a hash value which is incorporated into the file name to provide a unique file name to correspond to the contents of the source file.

This is further illustrated by the example of FIGS. 3a and 3b. FIG. 3a shows a text file which is a simple computer program written in the C language comprising a "printf" statement and an "include" statement which incorporates the file "stdio.h" into the program. The database generation means, referred to as the "collector" and in the present example a part of the compiler which compiles the computer program, generates the database files shown in FIG. 3b. Shown in FIG. 3b are the database component files foo.2rBQsT.bd, which is the database component files representative of the linked executable file foo.c.luoYuw.bd, which is the database component file representative of the source file "foo.c", and the database component file stdio.h.OyPdOs.bd for the source file "stdio.h", which was incorporated into the program foo.c through the include statement.

Each database component file name includes a hash value which, when combined with the file name of the source file results in a unique file name. The hash value is computed as a function of the contents of the source file wherein if the contents of the source file changes, the hash code changes. For example the string "2rBQsT" in the database file name foo.2rBQsT.bd, the string "luoYuw" in file database name foo.c.luoYuw.bd and the string "OyPdOs" database file names stdio.h.OyPdOs.bd are the hash values generated and incorporated into the database file names.

The database component file symbol reference comprises symbol identification information and line identification information. The symbol information consists of a symbol triple containing the symbol name, line number in the source file where the symbol is located, and the symbol type. The line identification information comprises a list of triples, each triple identifying relative line numbers within the source file, length of the line and hash value of the line. the hash value is computed from the contents of the line of text (e.g. the sum of the bytes in the line); thus, if the contents of the line are modified or the line is moved because of the insertion or deletion of text, the hash value will correspondingly change.

An illustration of the contents of a database component file for the program of FIG. 3a is illustrated in FIG. 3c. The "symbol table section" 400 table" 410. The semantic table section 410 contains a triple for each use of each symbol, identifying the symbol name, the line number in the source file where the symbol is located and the type of the symbol. The line identification section 420, contains the line number, length and hash value triples which correspond to the lines of text in the source file.

The index file provides the means for querying or searching the database component files for the occurrence of symbols which are the subject of the query. In the present example, the index file contains a list of all symbols used and the names of the database component files each of the symbols is contained in.

A source comprises one or more text files. These text files may or may not, depending upon the application, be related to one another. For example, a source may consist of text representative of a document such as a book or a magazine article. Separate text files may be created for the different sections of the document, such as the title, introduction, abstract, bibliography, as well as the body of the document. If the source is a computer program, the source may comprise a single file containing all the codes for subsequent compilation and execution of the program or the source may be spread among a plurality of files wherein one file contains the code of the main program and other files contain the source code for sub-programs which are referenced in the main program in the form of sub-routine calls or include statements, such as the "# include " statement utilized in the C-programming language.

As each file containing code is compiled, the information to be incorporated into the database component file (".bd file") is generated. Prior to generating the database component file, a unique name is generated for the database component file to be created. The name of the database component file is derived from the name of the text file and a hash value. The hash value is computed as a function of the contents of the file such that if the contents of the text file changes, the has code changes thereby distinguishing between the data base component files for different versions of the same text file.

In some instances, the same text files may frequently be incorporated into a multiplicity of different sources. For example, with respect to computer program source, the same text files containing declarations which reference sub-programs may be incorporated into the text source files containing the code of the main program. To eliminate the duplication of the same database component file in such instances, prior to generating a database component file, the name of the database component file is generated and compared to a list of currently existing database component files. If the name of the database component file exists, the database file is not regenerated and duplicated, because the existing database file can be used for the source file. By eliminating duplicate database files, processor overhead and memory used to store the database component file is saved.

The hash value may be generated by any one of many ways which derive the hash values from the contents of the database component file. For example, the hash value used to form the database component file name can be computed according to the sum of all the bytes contained in the file.

Preferably, the hash value is a sum of various key pieces of information to be contained in the database component file. For example, if the information to be contained in the database component file is the information shown in FIG. 3c, the hash value would be generated as follows: a separate hash value is computed for each of the sections in the file and the hash value incorporated into the file name is the sum of the hash values for each of the sections in the file.

To generate the hash values for each of the sections in the file, certain information is selected from the section and summed together. For example, the magic number (the first 2 or 4 bytes in a UNIX ® file), source type ID, major and minor version numbers of the file (e.g. version 2,1), line indicator, case indicator (the case indicator is set if the case of characters is not significant) and each character in the language name string are summed to compute a hash value for the section. The hash value for the source name section is generated from the ASCII value of each character from the file name and the relative field, if the relative field is set to a value of one (the relative field indicates whether the file was identified by a relative path or absolute path). The hash value for the referenced section is generated from the sum of each hash value for each referenced file and the ASCII value of each character from the name of each referenced file. The hash value for the symbol table section is the sum of the ASCII value of each character from each string in the symbol table section. The record type ID, line number and semantic tag for each record in the semantic table section are summed together to generate the hash value. In addition, the line length and hash value (determined according to the sum of the bytes for the line) for each line in the line ID section are summed and a value of one is added for each line that has its inactive indicator flag set (the inactive indicator is used for debugging tools) to generate the hash value for the line ID section of the database component file.

Thus, the file name incorporating the hash value would be: "[source code file name].[hash value].bd". It is preferred for easier identification that the suffix ".bd" is used to consistently identify those files which are database component files.

To save memory space, simplify the file name generation process and to simplify the query or browse process, it is preferred that the name of the directory in which the database component file resides is not incorporated into the file name. This is possible because each database component file name is unique and relates to a specific text file of the source. Therefore, the query or search program simply searches file directories in the file system until the unique database component file name which corresponds to the text file name is found. To minimize the number of file directories to search for database component files, it is preferred that a means is provided which contains a listing of all directories in which database component files are located. The query program will then search for database component files only those directories listed. Preferably, by default, the query program will search only the current working directory. Expansion of a search beyond the working directory is then indicated by a specific file recognized by the browser to provide a list of the directories of the file system to search.

Once the database component file(s) is created, an index file is generated to provide an index into the database component file. The index file contains the symbols (e.g. text) by which a query may be performed and a list of the database component files in which each symbol is found.

To query (query may be also referred to as search or browse) a database for a symbol, the index file is reviewed to determine the database component files of the database, and thus the corresponding text files of the source, the symbol is located in. The database component files containing the symbol are reviewed to retrieve the symbol information contained therein which indicates the location of the symbol in the source text files. The results of the query are then returned to the user. The information returned may be in a variety of formats including in the form of a listing of source text files and line numbers where the symbol is located, the lines of text from the file in which the symbol is located or a plurality of lines from the text file surrounding and including the line in which the symbol is located.

Continuing with the present example from FIG. 1, if a specific symbol is the subject of a query and is searched for in the Source 1 sub-directory, the index, Index1, will be reviewed to determine which database component files the symbol is contained in. If the index file states that the symbol is found in a.c.database.bd, that database component file is reviewed to retrieve the symbol information containing the symbol name, line number and symbol type as well as the line length and hash value. The text source file corresponding to the database component file, that is a.c, is reviewed and the line of text at the line number designated is retrieved for the user.

If the database component file and index file are generated and the source file is subsequently modified, search errors will occur unless the database component files and index file are also subsequently updated. To alleviate the effect of an inconsistent database, line identification information is included in the database component files. The line identification information contains the line number, line length and a hash value generated according to the contents of the line. Prior to the retrieval of lines of text from the source text file, a hash value is computed according to the text at the referenced line number and the line length and computed hash value are respectively compared to the line length and hash value stored in the database component file. If the values are equal, the proper line of text has been found and is provided to the user as a result of the query. If one or both values do not match, the the source file has been changed subsequent to the generation of the database file. An error message may then be generated telling the user that the database file needs to be updated. Alternatively, if the line of text has been moved to a different line in the source text file, it may still be found by comparing the line length and hash value stored in the database file to line lengths and generated hash values for other lines from the source text file to find a match. Preferably, to provide a more accurate match, the line lengths and generated hash values for the lines of text above and below the line of text to be retrieved are compared to the line lengths and hash values, representative of three sequential lines of text, stored in the database component file. Thus, if the line lengths and has codes of the sequence of three lines of text match a sequence of lines lengths and hash values stored in the database component file, a match is found and the line(s) of text is returned to the user as a result of the query.

Figure 4A:
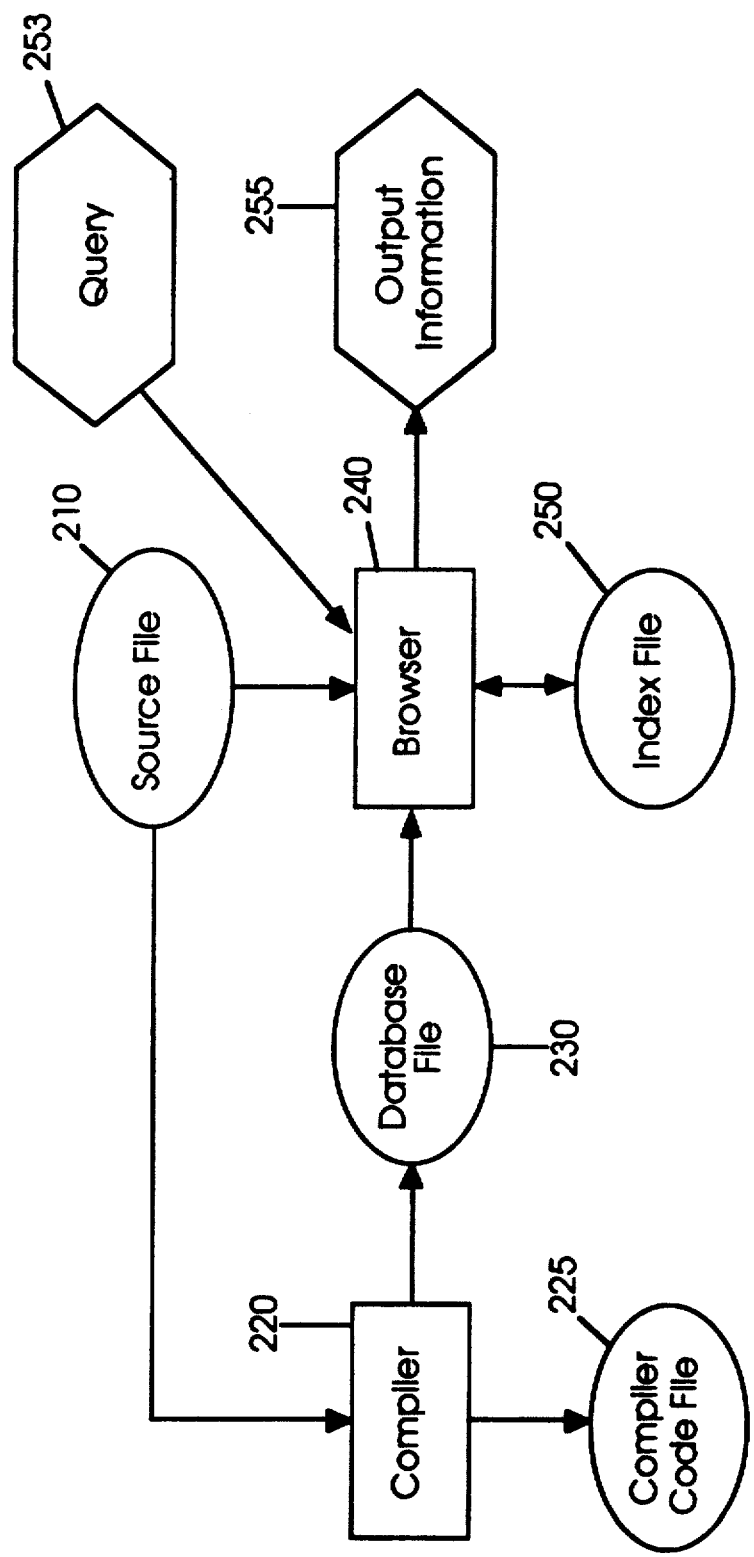
FIGS. 4a, 4b and 4c illustrate the structure of a preferred embodiment of the present invention.

A preferred embodiment of the present invention is described with reference to FIGS. 4a, 4b and 4c. The present invention is preferably divided into two tasks or structure (herein referred to as the "collector " and "browser"). In the present example of the preferred embodiment, the source text file comprises text files in the form of computer code such as a program written in the C language. The collector is incorporated into the C language compiler 220. Thus, the compiler 220 generates the compiled or object code 225 and generates the corresponding database component file 230 for the source text file 210. The database component file contains a listing of symbol identification information containing the symbol name, the line number the symbol is located at and the type of symbol. Furthermore, the database component file contains line identification information, comprising the line number, the length of the line and the hash value generated therefrom. The line identification information, as explained above, is used to check whether the line number identified by the database file is the correct lie of text to retrieve from the text file and present to the user as a response to a query.

To perform a query, the browser 240 is employed. The browser 240 generates an index file 250 which provides a reference of symbols and the names of database component files 230 the symbols are contained in. To perform a query, the browser 240 reviews the index file 250 and the database component files 230 identified in the index file as containing the symbol queried, retrieves the lines of text in the source text file 210 containing the symbol identified in the database component file 230 and presents such information as output information 255 to the user.

Figure 4B:
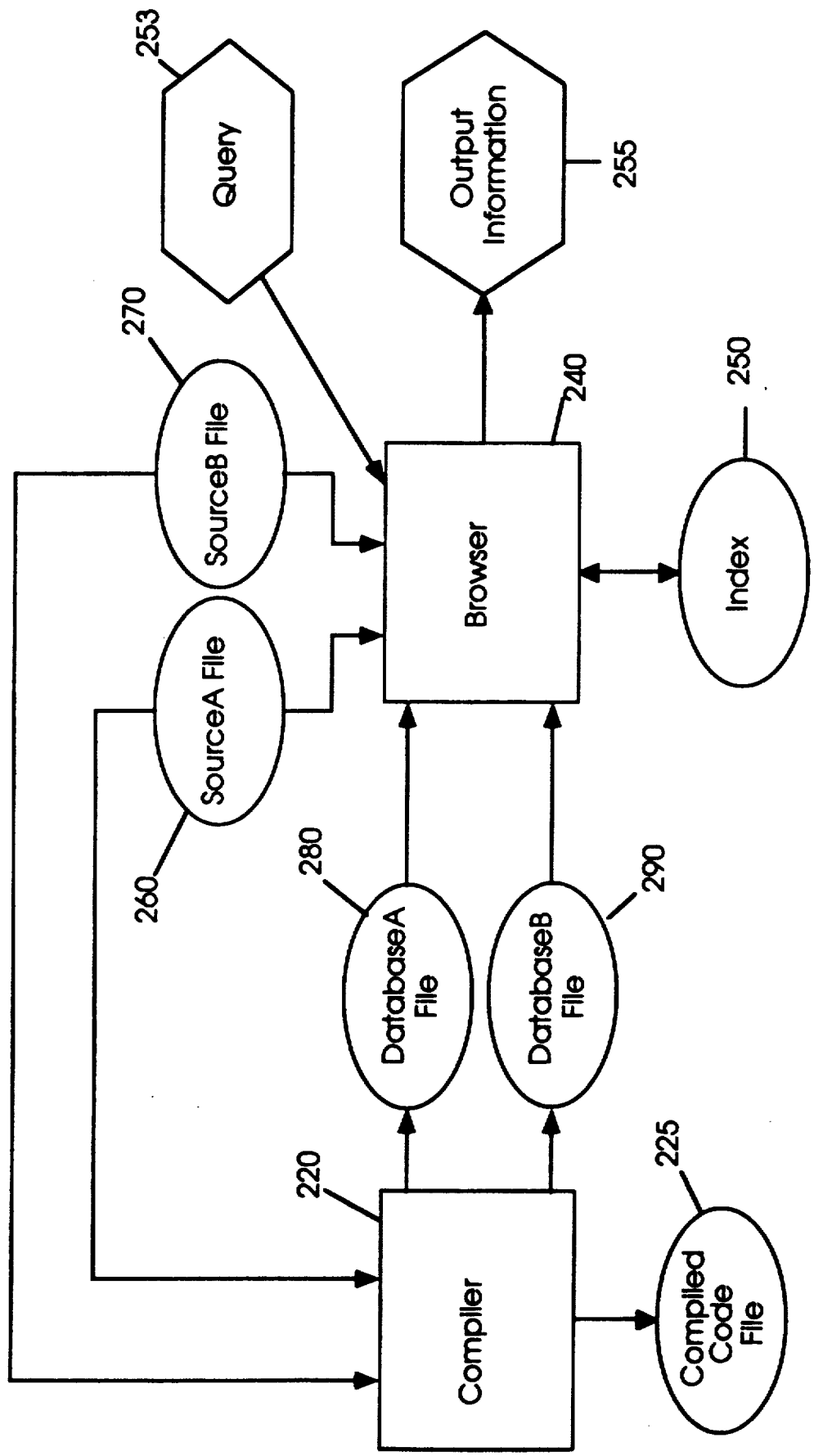

FIG. 4b illustrates the structure of the preferred embodiment, wherein two text files, source file A 260 and source file B 270, form the source that is input to compiler 220 to generate the compiled code 225 and the database, respectively comprising database component file A 280 and database component file B 290, which are then utilized by the browser 240 to provide the output information 255 which comprises the result of a query to the user. It should be noted that only index file 250 is generated. In as much as text file A and text file B are contained within the same directory, only one index file is required. However, if the database component files are written to separate directories within the file system, separate index files would be generated.

Figure 4C:
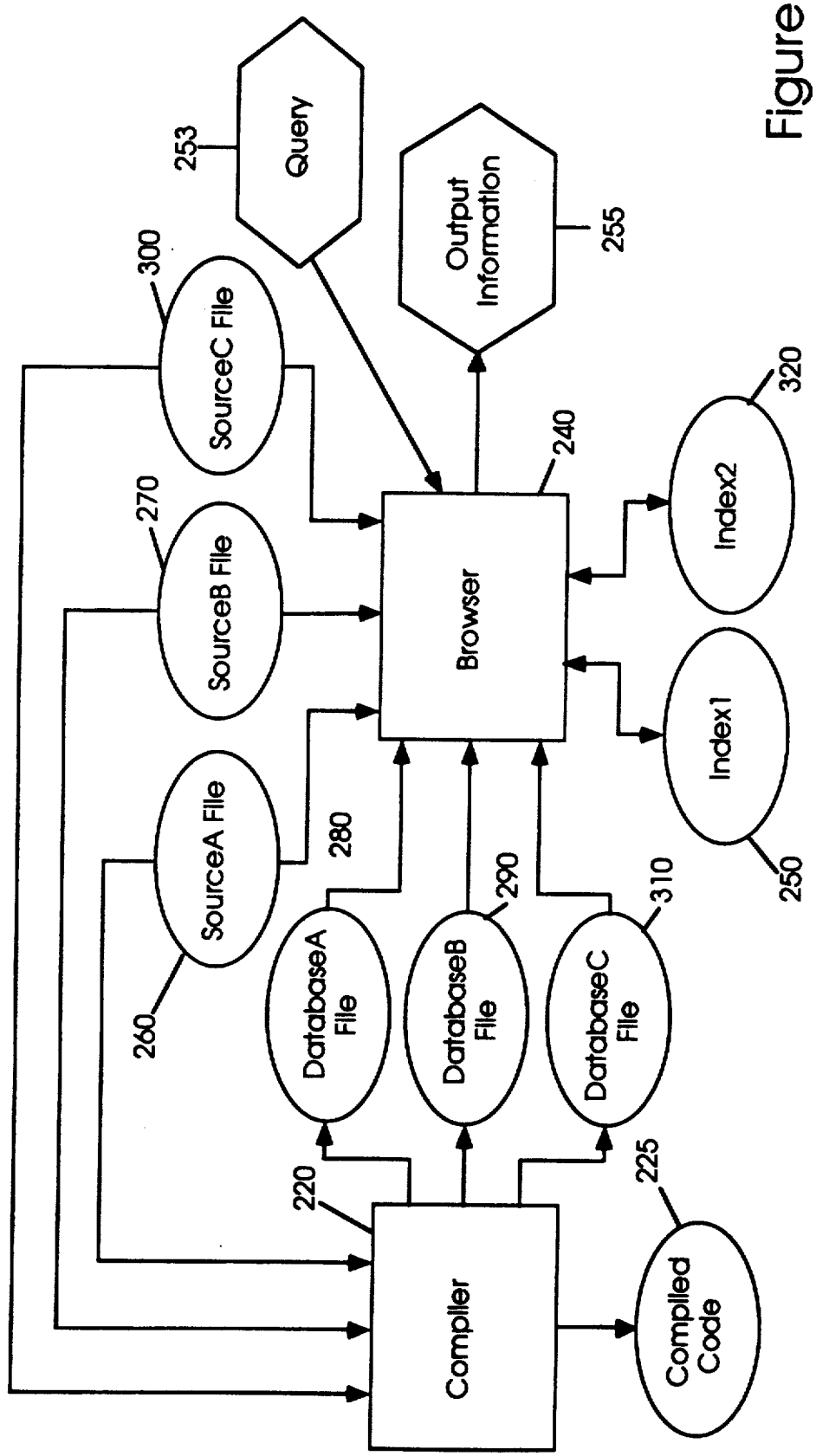

FIG. 4c illustrates the addition of text file C 300 to the source which, in conjunction with text file A 260 and text file B 270, is compiled by compiler 220 to generate compiler code 225 and, the database respectively comprising, database component file A 280, database component file B 290 and database component file C 310. In as much as test file C 300 is located within a different directory than text file A 260 and text file B 270, two index files are generated, one for each directory. The browser 240 generates two indices, Index1 250 for database component files 280, 290 and Index 2 320 for the database component file 310. The browser 240 utilizes to the index files 250, 320 determine the lines of text to be retrieved from the source files 260, 270 and 280 according to the query to be presented as output information 255 to the user.

Figure 5A:
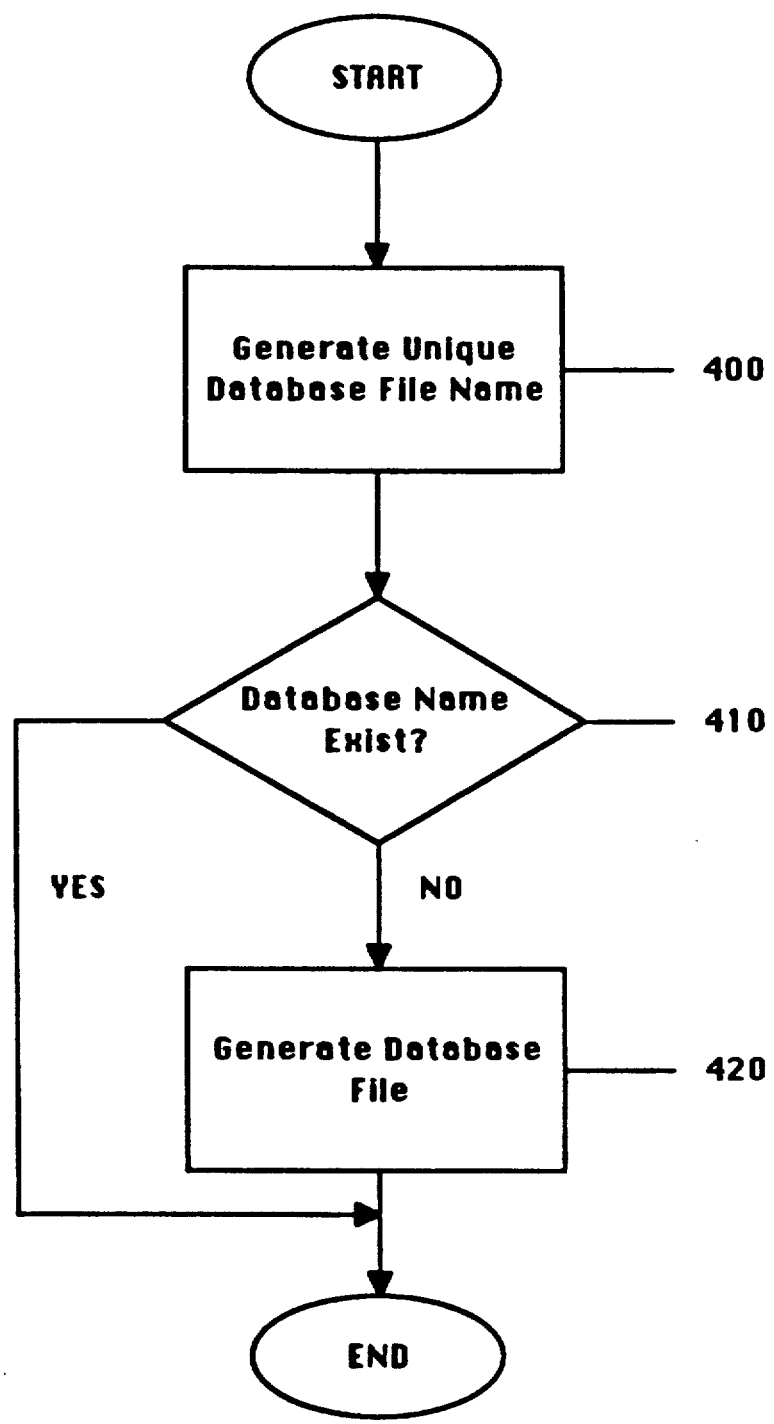
FIGS. 5a and 5b 5c are flow charts of the process of the preferred embodiment of the present invention.

The process of the preferred embodiment of the present invention is explained with reference to FIGS. 5a and 5b. Referring to FIG. 5a, at block 400 the collector generates a unique name to identify the database component file. The database component file name is a combination of the source text file name concatenated with a hash value which is concatenated with an identification suffix which identifies the file as a database component file (for example, ".bd"). The hash value is generated as a function of the contents of the database component file and should be computed in a manner such that if the contents of the file changes the hash value changes. At block 410, the database component file name generated is checked against the existing database component file names, If the database component file name exists, this indicates that a database component file for that particular source text file exists and there is no need to generate another database component file. If the database component file name does not exist, at block 420 a database component file identified by the unique database component file name is generated.

Figure 5B:
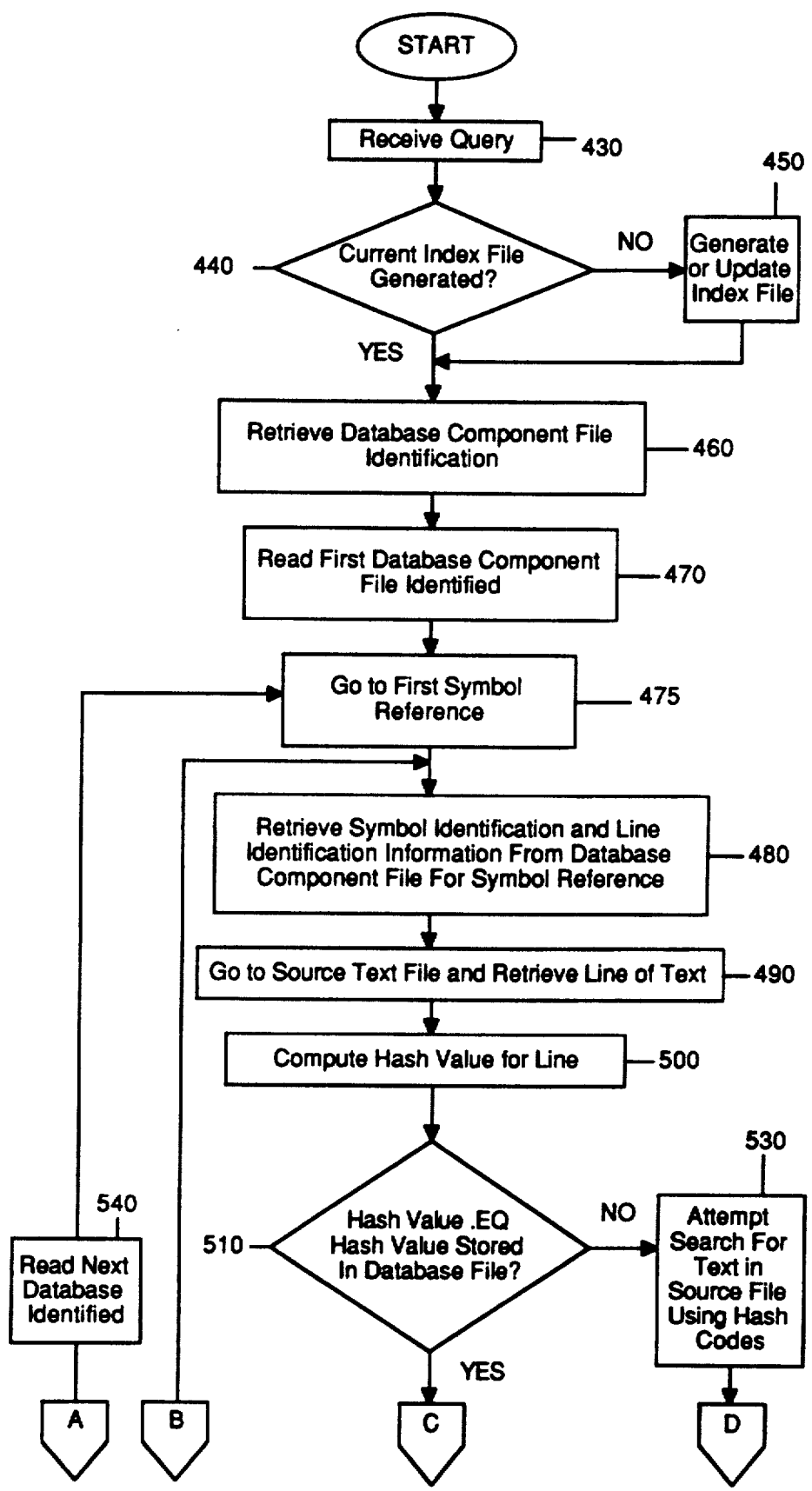

FIG. 5b illustrates the functions that would be performed by the browser element including the generation of the index file and the execution of queries. At block 430 a query is received and at block 440 file directories are examined to determine if an index file needs to be generated or updated. The index is built from scratch if there is no index. The index is updated if there are any database component files that have been created since the last time the was created/updated. If an index file needs to be generated or updated, at block 450, the index file is generated or updated. At block 460, the index file is reviewed and the database component file identification information for the symbol, which is the subject of the query, is retrieved. This information is then used at block 470 to access the first database component file identified. At block 475, the line number of the first symbol reference is identified and at block 480, the symbol identification and identification information is retrieved from the database component file. At block 490, the corresponding line of text is retrieved from the source file and at block 500 the hash value is computed for the line of text.

At block 510, the length of the line and hash value computed are compared with the line length and hash value contained in the line identification information retrieved from the database component file. If the two are equal, the line of text containing the symbol which is the subject of the query is output to the user at block 520. If the line lengths or hash values are not equal, at block 530, search is attempted through the source file in order to find the line of text which may have been shifted due to the insertion and/or deletion of text subsequent to the generation of the database file. As described above, this may be done by generating a line length and hash value for each line of the source file and comparing the first length and hash value to the line length and hash value retrieved from the line identification information in the database component file. Preferably, this process is performed for three lines of text, the line of text above the line to be retrieved and the line of text below the line to be retrieved. Thus, if a sequence of line lengths and corresponding hash values for three sequential lines match those retrieved from the database component file, the line of text is output to the user as responsive to the query.

At blocks 525 and 527 the process continues for the next line containing the symbol which is the subject of the query until all references in the current database component file and corresponding text file are retrieved. The process continues to the next database component file identified by the index file via blocks 530 and 540 and process through blocks 480 through 530 until the last database file is reviewed and the query process is completed.

The database files comprising a database generated according to the present invention may reside in a single directory or in multiple directories within the file system. For each text file of the source, the collector will create a corresponding database component file and will, by default, place the database component file into a sub-directory of the current working directory where the source text file is located. Preferably the sub- directories containing the database component files are uniformly identified by the path name [Source Directory Name/.sb. An index file is also located in each database component file sub-directory providing an index into the database component files located therein.

Though various enhancements to the database system of the present invention, a database may be extended and referenced in a variety of ways.

Figure 6:
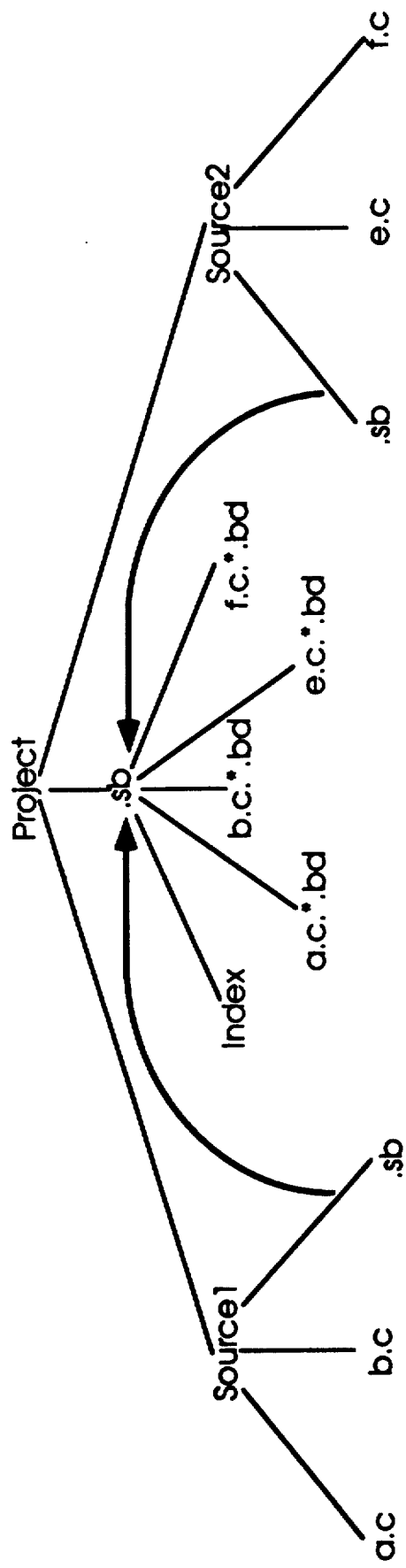
FIG. 6 illustrates a symbolic link which connects a common database component file to one or more directories in the system.

For example, a single common database directory may be employed by all the directories from which source programs are processed through the collector by installing a reference, referred to as a "symbolic link", between the source files directory and the directory containing the common database component files. This is illustrated in FIG. 6, wherein the main directory Project contains two sub-directories Source1 and Source2, Source1 containing, source files a.c and b.c and Source2 containing source files e.c and f.c. The corresponding database component files are located in common directory .sb which is a sub-directory of main directory project and contains an index file and database component files a.c.database.bd, b.c.database.bd, e.c.database.bd and f.c.database.bd. For example, in the UNIX ® (UNIX is a trademark of AT&T) operating system, a symbolic link may be established by executing the following command:

ln −s<directory path name>/.sb

Furthermore, when generating database component files, it may be desirable to store the database component file in a directory other than a subdirectory of the current working directory. For example it may be desirable to place, in a single directory for easy reference, those database component files commonly referenced by source files located in a plurality of directories. In addition, a query, by default, will review the index file and corresponding database component files located in the current working directory. Often, it is desirable to execute a query on database component files inside as well as outside the current working directory.

A file, having a predetermined identifiable name, referred to in the preferred embodiment as the .sbinit file, is used by the collector and browser to obtain information about the database structure. The .sbinit file contains the commands "import", "export" and "split".

To query multiple database component files in directories other than the current working directory, the import command is used to indicate to the browser the path names of directories containing database component files outside the current working directory to read each time it performs a query. The import command has the form:

import=path> where path is the path name to the file directory that contains the .sb sub-directory containing the database component files to be imported. For example, if the current working directory is /project/source1, and the browser is to search project/source2 as well as /project/source1 when performing a query, the import command would be:
ti import /project/source2

Similarly, the "export " command, may be use to cause the collector which generates the database component files to store the files in a directory other than the current working directory. THE export command identifies the path name and source file name of those source files the database component files of which are to be located in a specified directory. This enables the user to save disk space by placing those database component files associated with identical files in a single database while still retaining distinct databases in separate directories for individual projects. The export command has the form:

export=prefix> into <path name> thus whenever a collector processes a source file having the path name which starts with <prefix>, the resulting database component file will be stored in <path name>/.sb. For example, to place the database component file created for source files from /usr/include in a .sb sub-directory in the directory project/sys, the export command would be:

export /usr/include into /project/sys.

Figure 7:
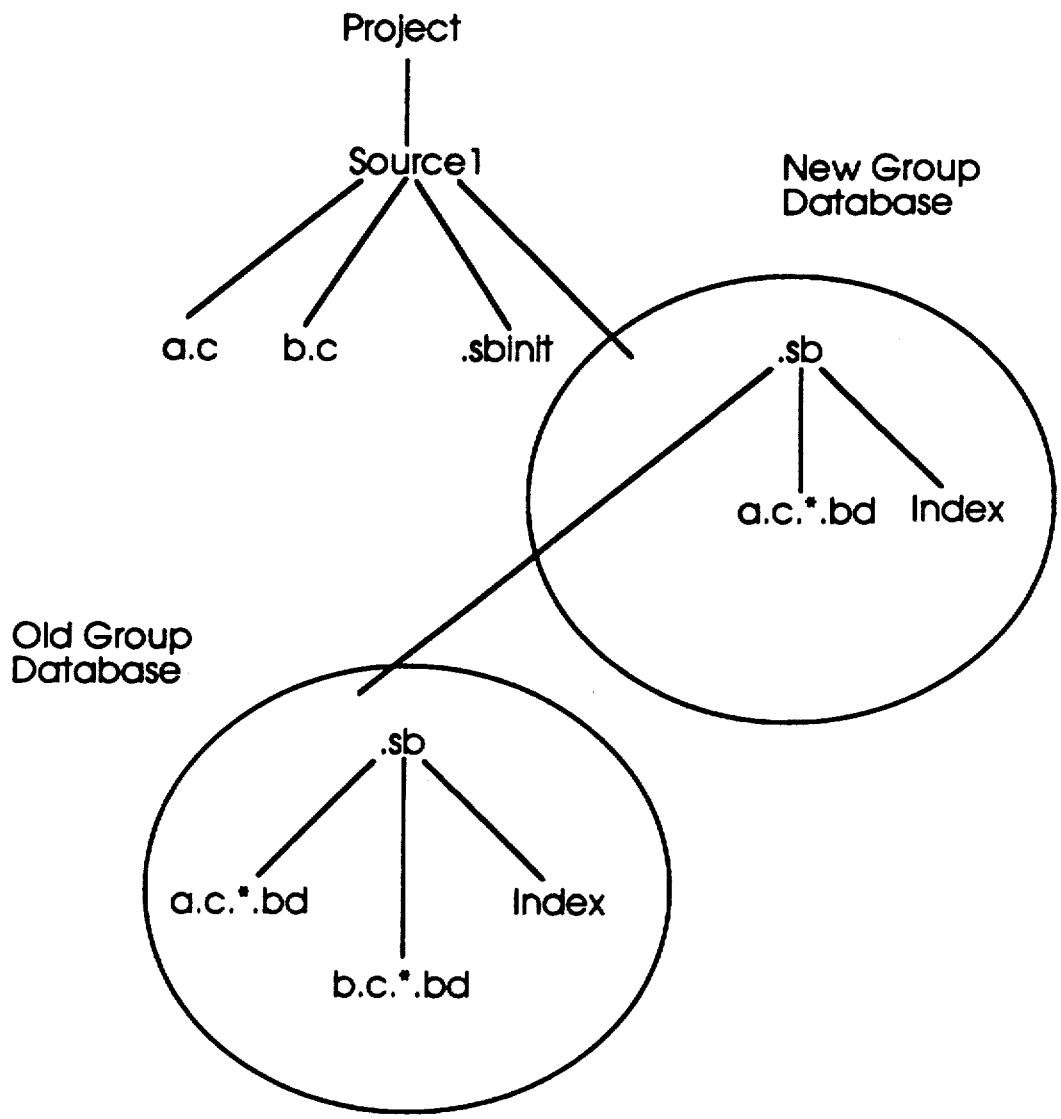
FIG. 7 illustrates the implementation of the split function to increase the speed of performing queries on large database component files.

To improve the performance of the system when working with a large number of database component files, a split function may be implemented. The split function splits the database component files into an "old" group and "new" group of database component files whenever the size of the index file exceeds a specified number of bytes indicating that the database is too large to efficiently perform updates within a predetermined period of time. Thus, when the database component files are updated thus requiring that the index file be updated, those source files which have changed subsequent to the last time the database component files were updated are updated and categorized in the "new" group of database component files, leaving the remaining database component files in the "old" group unchanged. Correspondingly, a new index file is created to index the new group of database component files while the index file to the old group of database component files remains unchanged. This increases system performance because the time it takes to build the index file is proportional to the number of database files that require indexing. Consequently, it takes less time to build a small index file for the new group of database component files than to rebuild one large index file for the entire group of database component files. This is illustrated in FIG. 7. The size of the index file in Source1/.sb is larger than the predetermined number of bytes. Thus, the old group of database component files has moved down a sub-directory to Source1/.sb/.sb and a new group of database component files is created comprising those database component files corresponding to source files which have been modified subsequent to the last time the collector process was executed and the database component files were updated. In the present example, only source file a.c has been modified; therefore the new group of database files in Source1/.sb contains a.c.database.bd and a new index file is created for a.c.database.bd. The split command has the form:

split<size> where <size> is the size, in bytes, of the database index. When the index file is greater than or equal to <size>, the split function will be initiated.

Figure 8:
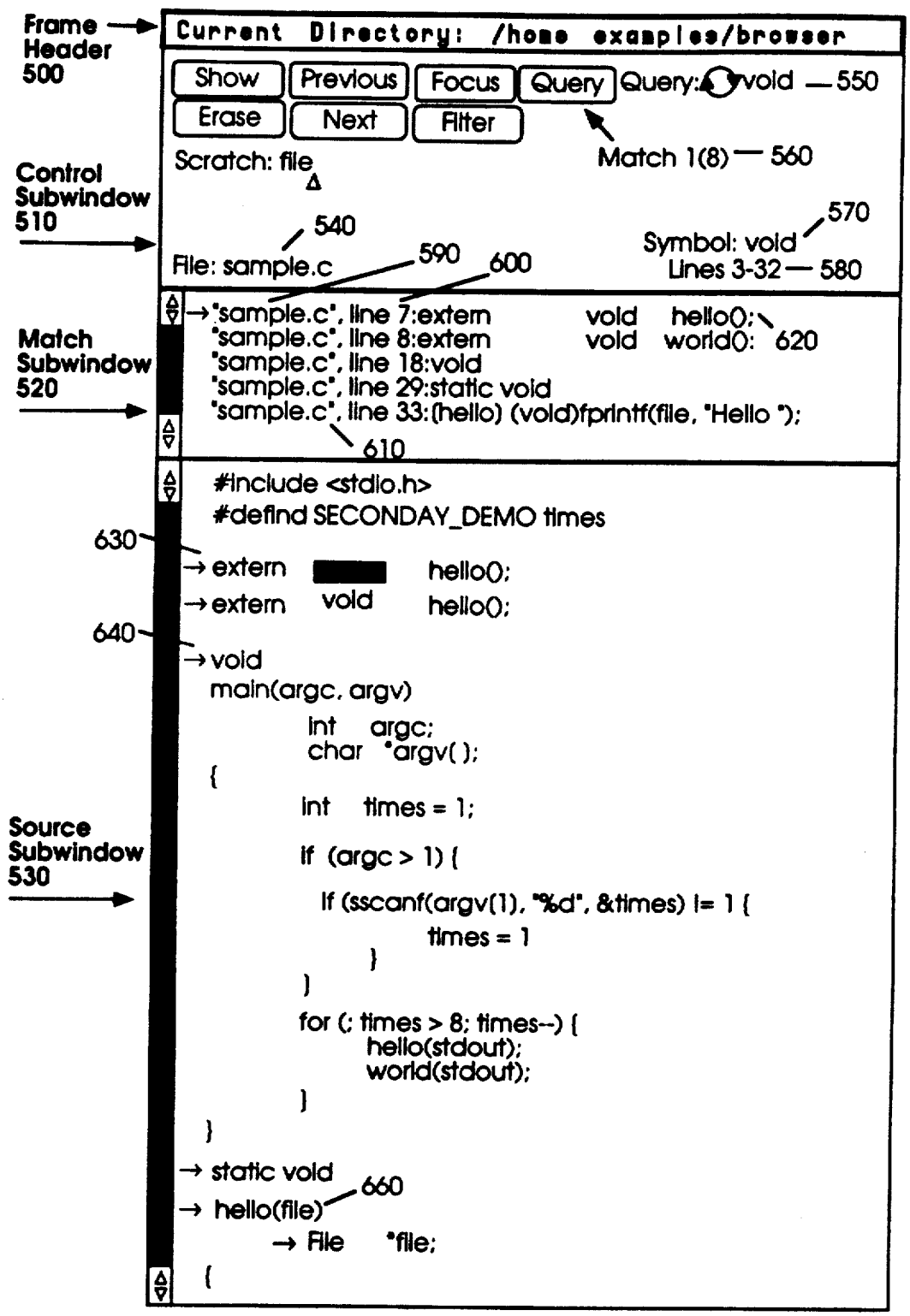
FIG. 8 is illustrative of a user interface to the system of the present invention.

The information provided to the user indicating the results of the query may take a variety of forms and is implementation dependent. FIG. 8 is an example of a user interface containing information regarding the source file, the parameters of the query, the lines of text from the source file which are returned pursuant to the query and a predetermined number of lines of the source file which surround the line of text which contains the symbol which is the subject of the query.

The frame header 500 indicates the current working directory. The control sub-window 510 displays the current query information such as the name of the source file containing the current match 540, the query parameter 550, the number of matches (occurrences of the symbol specified by the query), as well as the match currently displayed 560, the identifier or string constant for the current match 570 and the line numbers of text displayed 580. The control sub-window 510 also contains the controls needed to manipulate the browser. For example, the buttons available in the sub-window permits the user to issue queries, move between matches, move between queries, delete matches and queries and refine or narrow queries.

The match sub-window 520 displays all matches found by the current query. The information provided for each match includes the name of the file in which the match appears 590, the line number in the file on which the match appears 600, the function in which the match appears 610 (if applicable) and the line of text containing the match 620.

The source sub-window 530 displays a portion of the source file that contains the current match. The match is identified by a marker such as a black arrow 630. The source sub-window 530 may optionally contain markers in the form of gray arrows 640 to identify other matches found during the current or other queries.

Thus a user, by using the user interface such as the one shown in FIG. 8, can perform a variety of tasks employing the system of the present invention, including issuing queries, modifying queries, modifying the databases searched, as well as reviewing the results of the queries. As is apparent to one skilled in the art, the user interface can be tailored to each implementation to include additional functionality or tools for the user to refine his queries, as well as to modify the information content and organization of information which is presented to the user to show the results of the queries performed.

Figure 9:
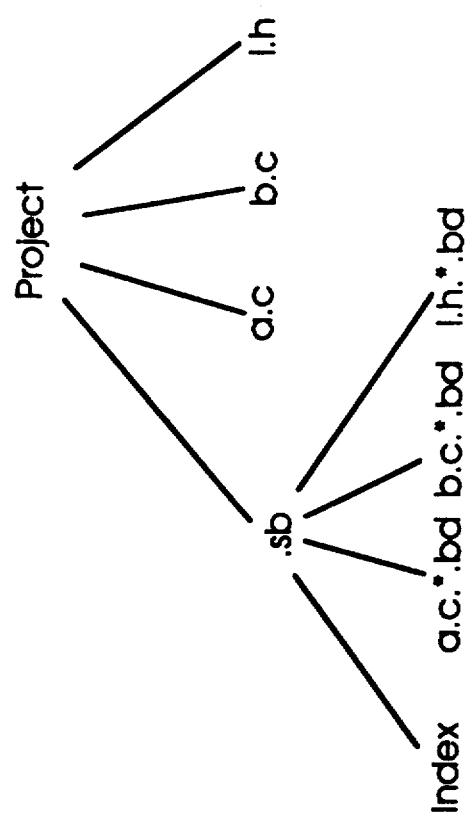
FIG. 9 illustrates race conditions which can occur in a multitasking environment.

The flexibility of the system of the present invention provides for a multitasking capability wherein multiple collectors as well as multiple browsers may be operating simultaneously on a number of database files. The database files operated on may include duplicate files that are accessed by multiple collectors or browsers. A problem which arises in the multitasking environment is the existence of race conditions. This problem arises when two processes or devices access a single source file or corresponding database component file at the same time resulting in corrupt data being written into the database component file and/or corrupt data being read out of the database component file. An example of the race condition may be explained by reference to FIG. 9. The main directory project contain source files a.c., b. and i.h. Source files a.c and b.c contain statements which include file i.h. Thus, if two compilers are initiated to compile files a.c and b.c, both compilers will attempt to generate a database component file for i.h, because i.h is included in source files a.c and b.c. As a result, both compilers attempt to simultaneously create i.h.database.bd which may result in corrupted data because both compilers are writing into the same file concurrently. In addition, if two queries are run in parallel and the index for the databases a.c and b.c have not been generated, each query mechanism will initiate a process to build an index. Therefore the index file may contain corrupted data as the result of two processes concurrently writing into the same index file.

To prevent these problems, a process is utilized which employs a locking mechanism to prevent more than one process from accessing a file at any one time. A sub-directory is created which is referred to by a predetermined name, herein referred to as "new root", which is used as part of a locking mechanism to prevent more than one collector or browser from interacting simultaneously with a database component file. In conjunction with the specially named sub-directory, a locking mechanism is employed using atomic operations whereby if the operation fails, the process step fails and the process will either fall to a wait state or an error state (depending upon the application). In addition, the use of this sub-directory provides the means for determining when an index file requires an update to conform to a recent modification of a database component file.

Figure 10:
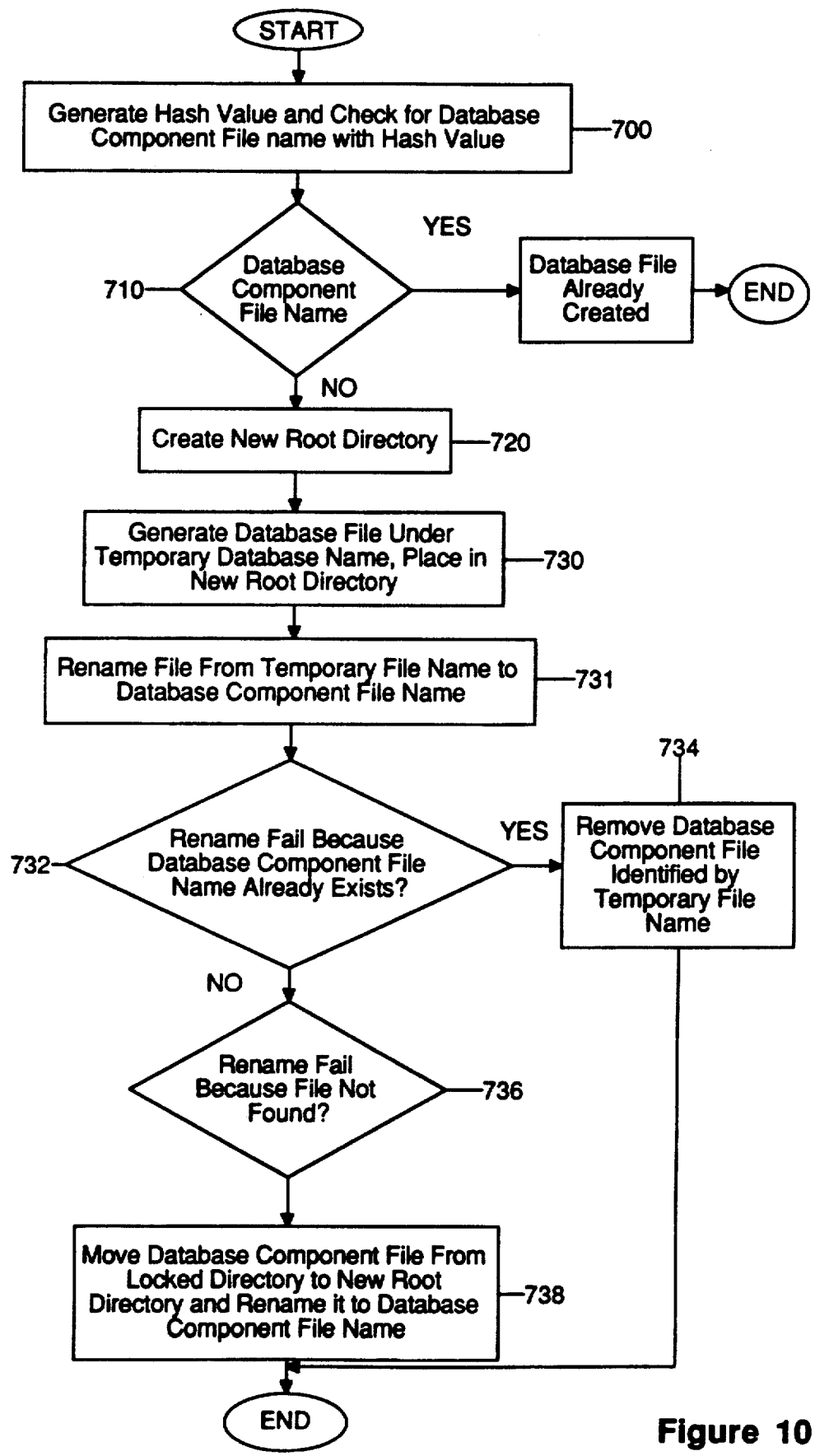
FIG. 10 is a flow chart illustrating the process for creating a database component file.

Referring to FIG. 10, the collector, at block 700, prior to generating a database component file, will generate the hash value, combine it with the source file name and check whether the database component file name already exists which indicates that there is no need to generate a new database component file. At block 710, the hash value is compared against the existing database file names. If the file name exists, the database already exists and there is no need to generate a new database. If the file name does not exist, at block 720, a sub-directory, which is referred to herein as "new root", is crated. At block 730, the database file is then generated and placed in the new root directory. During the creation of the database component file, the file is identified by a temporary file name. Preferably the temporary file name is the concatenation of the time the film was opened, the machine ID of the machine the collector is executing on and the process ID. Thus the temporary file name would be [time][machine ID][process ID]. IP. Once the generation of the database component file is complete, at block 731, the file is renamed from its temporary file name to its database component file name. If, at block 732, the rename operation fails because a file with the same database component file name exists, the system recognizes that there is no need to have duplicate files and the file identified by the temporary file name is deleted at block 734. Occasionally while one compiler process is generating a database component file, a browser process will be operating and will determine that an index file needs to be generated or updated. For example, this may occur when a first database component filer has been generated and a second database component file is in the process of being generated when an index file is generated. As will be described in detail below, one of the steps in the process for the generation of the index file is to rename the new root directory to "locked" and move all the files contained in the locked directory to another directory, referred to herein as "old root". Thus the rename file operation to rename the database component file from a temporary name in new root to the database component file name also in new root will fail if a file with the temporary file name does not exist in new root. At block 736, if the rename operation fails because the file is not found, at block 738 the database component file identified by the temporary file name, is moved from the locked directory to the new root sub-directory and is renamed from the temporary file to its database component file name.

Figure 11:
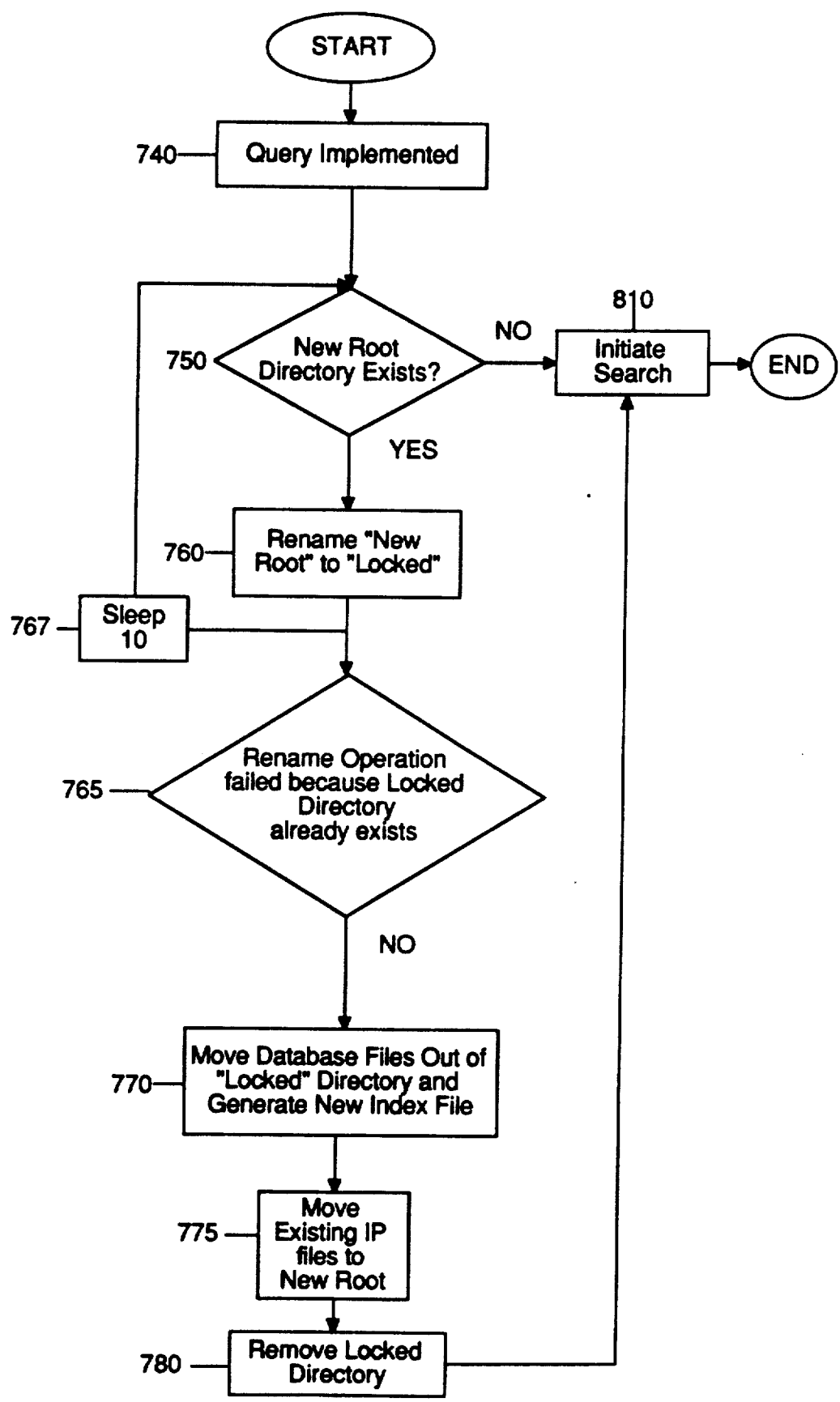
FIG. 11 is a flowchart illustrating the process for issuing a query and building an index file according to a preferred embodiment of the present invention.

Referring to FIG. 11, when the index file is to be generated (in the preferred embodiment, this is performed when a search or query is initiated) at block 740, the sub-directories are checked to determine whether a sub-directory identified as new root exists (block 750). The presence of a directory names new root indicates that the index file needs to be updated for the database component file(s) contained therein. At block 760, the new root directory is renamed to a second predetermined sub-directory name, "locked". As will be evident subsequently, this protects against access and use of the database files contained therein until such time that the index file is completely generated. If, at block 765, the rename operation fails because a locked directory already exists, this indicates that an index build is in progress and the current process has to wait until the index build is complete. Therefore, at block 767, the current process puts itself "to sleep" (i.e. suspends itself) for a predetermined time period (e.g. 10 seconds). At the end of the time period, the process returns to block 750 and checks to see if the new root directory still exists. This process continues until the locked directory no longer exists. At block 760, once the rename operation is executed to rename "new root" to "locked", at block 770, the database component files are moved out of the "locked" directory to a sub-directory having a third predetermined name, in the present example, "old root", and the index file is generated. At block 775, any IP files which may exist are also transferred out of the locked directory to a new root directory which already exists or is created by the process.

Once the files are transferred and the index file is generated, the operation is complete. To indicate the operation is complete to other processes attempting to access the database files, at block 780, the locked directory is removed from the file system. Thus, if a subsequent process performs a search and looks for the new root directory, it will find that none exist, indicating that the index file is up to date and a new index file does not need to be generated.

When a query is initiated and the browser attempts to access a database component file while a new index file is being generated, it will be prevented from doing so because an index does not exist and a search for the new root directory will fail (because it has been renamed to "locked"). Thus, the rename directory operation, which is an atomic operation, will fail and the process will either remain in a wait state (i.e. "put itself to sleep") until it can perform the operation or will branch on an error condition or to a predetermined state such as waiting for access. Preferably the browser process will be put into a wait state for a predetermined time period, e.g. 10 seconds, check to see if the index file generation process is complete and continue in the wait state for another time period. This process is continued until the index file generation process is complete and the rename operation can be executed.

In addition, if a new new root directory is created during the index build process, and another query is issued, the second query will also be put into a wait state and suspend its index rebuild until the locked directory is removed.

While the invention has been described in conjunction with the preferred embodiment, it is evident that numerous alternatives, modifications, variations and uses will be apparent to those skilled in the art in light of the foregoing description.

What is claimed is:

1. In a multiprocess computer system comprising at least one CPU, input/output means and memory containing a file system, said file system comprising at least one directory comprising at least one source file comprising text, an apparatus for generating databases comprising database component files of symbols contained in the source files, generating index files for the database component files and for performing queries to search for symbols in the source files by searching the database component files to determine where the symbol is located in the source file, means for preventing errors which occur due to race conditions wherein said apparatus attempts to concurrently generate more than one database component file from the same source file, more than one index file from the same database component files or attempts to concurrently generate a database component file or index file and search the same database component file or index file, said apparatus comprising:

means for creating a temporary sub-director in the file system, said directory being a sub-directory of the current directory and being identified by a first predetermined name;

collector means for generating a database component file for a source file, said collector means identifying the database component file by a temporary name while the database component file is generated, said collector means generating the database component file in the temporary sub-directory;

means for renaming the database component file from its temporary name to a permanent database component file name once the database component file is completely generated, said means comprising an atomic command which, upon failure to execute, defaults to a predetermined state whereby the duplication of the database component file is prevented; and if a database component file is stored in the temporary directory, means for generating an index file comprising;

means for renaming the temporary directory to a second predetermined name, said means comprising an atomic command which, upon failure to execute, defaults to a predetermine state;

means for transferring the database component file from the temporary directory to a directory which is one of one or more sub-directories of the directory containing the source file;

means for creating an index file for the database component file, said index file being located in the same sub-directory as the database component file; and means for removing the temporary directory from the file system;

such that if a race condition occurs and there is an attempt to concurrently generate another index file, the means for renaming the temporary directory will fail upon execution thereby halting the means for generating the index file and preventing the errors which occur due to race conditions.

2. The apparatus according to claim 1, wherein said temporary file name comprises [time][machine][process ID].IP, where is the time the temporary file was created, [machine ID] is the ID of the machine the process which generates the database component file is operating on, and [process ID] is the ID of the process which generates the database component file.

3. The process according to claim 2, wherein if the step of renaming the database component file fails because a file identified by the permanent file name already exists, deleting the database component file identified by the temporary file name.

4. The apparatus according to claim 1, wherein if the means for renaming the database component file fails because a file identified by the permanent file name already exists, means for deleting the database component file identified by the temporary file name.

5. The apparatus according to claim 1, wherein if the means for renaming the database component file fails because the database component file identified by the temporary name is not found in the temporary sub-directory;

means for searching for the database component file in other sub-directories of the source file directory;

if the database component file is found in another sub-directory of the source file dirctory, means for transferring the database component file from the sub-directory; the database component file was found in to the temporary sub-directory; and means for re-attempting to rename the database component file from its temporary name to its permanent database component file name.

6. In a multiprocess computer system comprising at least one CPU, input/output means and memory containing a file system, said file system comprising at least one directory comprising at least one source file comprising text, in a process for generating databases comprising database component files of symbols contained in the source files, generating index files for the database component files and for performing queries to search for symbols in the source files by searching the database component files to determine where the symbol is located in the source file, a process for preventing errors which occur due to race conditions wherein said attempts to concurrently generate more than one database component file from the same source file, more than one index file from the same database component files are made or attempts to concurrently generate a database component file or index file and search the same database component file or index file are made, said process comprising the steps of:

creating a temporary sub-directory in the file system, said directory being a sub-directory of the directory containing the source file and being identified by a first predetermined name;

generating a database component file(s) for a source file, said database component file being identified by a temporary name while the database component file is generated, said database component file being generated in the temporary directory;

renaming the database component file from its temporary name to a permanent database component file name once the database component file is completely generated, said step comprising an atomic command which, upon failure to execute, defaults the process to a predetermined state whereby the duplication of the database component file is prevented; and if a database component file is stored in the temporary directory, generating an index file comprising the steps of;

renaming the temporary directory to a second predetermined name, said step comprising an atomic command which, upon failure to execute, defaults the process to a predetermine state;

transferring the database component file from the temporary directory to a directory which is a sub-directory of the directory containing the source file;

creating an index file for the database component file located in the same sub-directory as the database component file; and removing the temporary directory from the file system;

such that if a race condition occurs and there is an attempt to concurrently generate another or index file, the step of renaming the temporary directory will fail upon execution thereby halting the process and and preventing the errors which occur due to race conditions.

7. The apparatus according to claim 6, wherein if the step of renaming the database component file fails because the database component file identified by the temporary name is not found in the temporary sub-directory;

searching for the database component file in other sub-directories of the source file directory;

if the database component file is found in another sub-directory of the source file directory, transferring the database component file from the sub-directory the database component file was found in to the temporary sub-directory; and re-attempting to rename the database component file from is temporary name to is permanent database component file name.

* * * * *

UNITED STATES PATENT AND TRADEMARK OFFICE
CERTIFICATE OF CORRECTION

PATENT NO. : 5,095,423

DATED : March 10, 1992

INVENTOR(S) : Gramlich et al.

It is certified that error appears in the above-identified patent and that said Letters Patent is hereby corrected as shown below:

In column 1 at line 44 and column 2 at line 45, please delete " data base " and insert -- database --.

In column 3 at line 1-2, please delete " component file is located, because the file name is unique for a particular ".

In column 3 at line 55, please delete " 5a and 5b 5c " and insert -- 5a, 5b, and 5c --.

In column 4 at line 11, please delete " with " and insert -- within --.

In column 4 at line 56-57, please delete " provide " and insert -- prove --.

In column 6 at line 8 (both occurrences ) and 11, column 9 at line 9, column 12 at lines 17-18 (both occurrences), column 13 at line 54 and 55, and column 14 at line 63, please delete " database " and insert -- * --.

In column 6 at line 51, please delete " the " and insert -- The --.

In column 6 at line 59, please delete " table" 410 " and insert -- contains the name of the symbols and the location of the symbol in the "semantic table section " 410.

UNITED STATES PATENT AND TRADEMARK OFFICE
CERTIFICATE OF CORRECTION

PATENT NO. : 5,095,423

DATED : March 10, 1992

INVENTOR(S) : Gramlich et al.

It is certified that error appears in the above-identified patent and that said Letters Patent is hereby corrected as shown below:

In column 9 at line 33, please delete " the (first occurrence) " and insert -- then --.

In column 10 at line 5, please delete " lie " and insert -- line --.

In column 10 at lines 49 & 50, delete " 5a and 5b" and insert -- 5a, 5b, and 5c --.

Figure 5C:
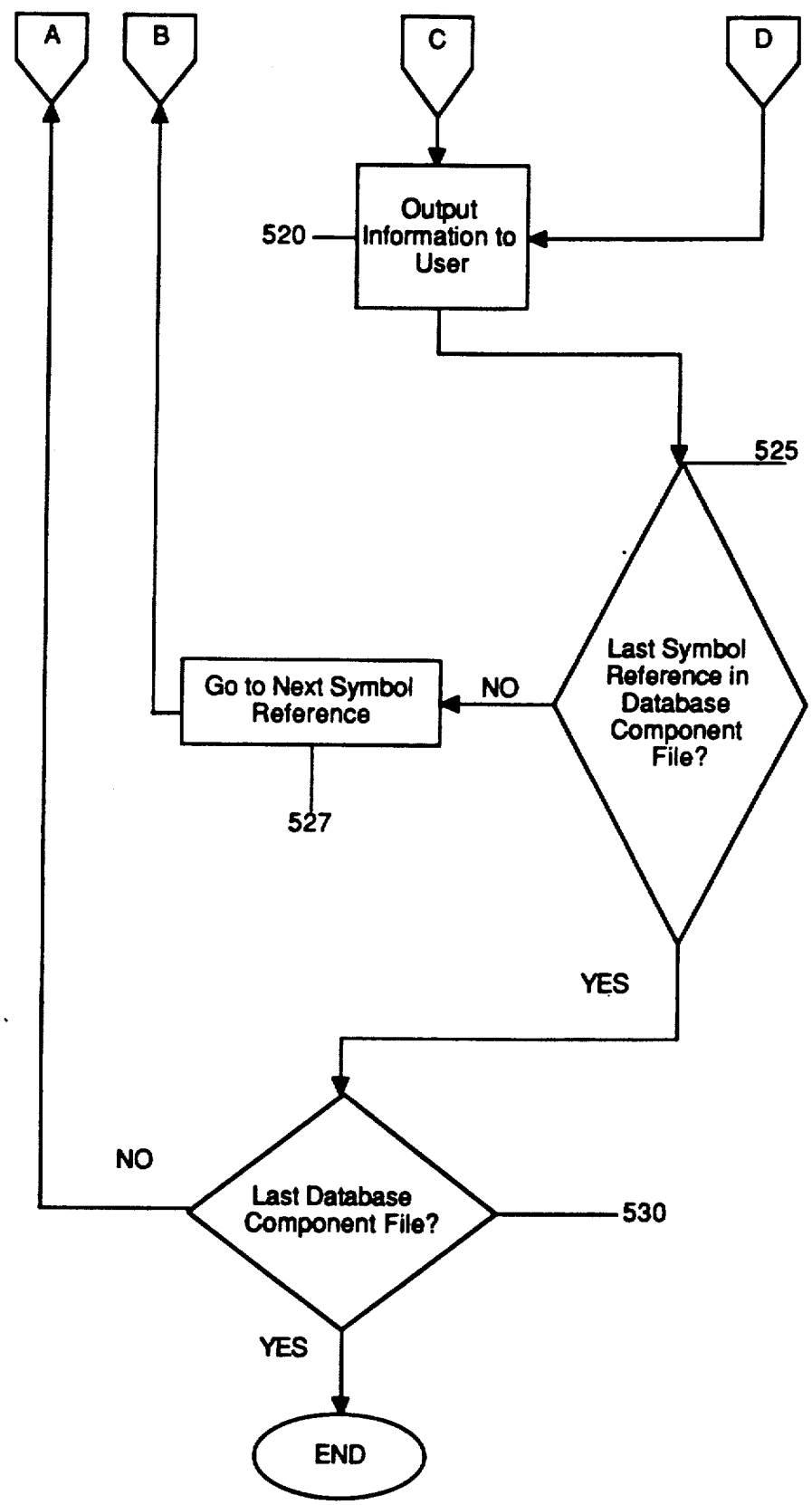

In column 11 at line 1, please delete "FIB 5b illustrates" and insert -- Figures 5b and 5c --.

In column 11 at line 9, please delete " the " and insert -- the index --.

In column 12 at line 59, please delete " ti ".

In column 12 at line 61, please delete " use " and insert -- used --.

In column 12 at line 64, please delete " THE " and insert -- The --.

In column 13 at line 6, please delete "=" and insert -- < --.

UNITED STATES PATENT AND TRADEMARK OFFICE
CERTIFICATE OF CORRECTION

PATENT NO. : 5,095,423

DATED : March 10, 1992

INVENTOR(S) : Gramlich et al.

It is certified that error appears in the above-identified patent and that said Letters Patent is hereby corrected as shown below:

In column 15 at line 26, please delete " value " and insert -- value generated and the database component file name generated using the hash value --.

In column 15 at line 31, please delete " crated " insert -- created --.

In column 15 at line 39, please start a new paragraph after " IP ."

In column 16 at line 6, please delete " names " and insert -- named --.

In column 17 at line 63, please delete " machine " and insert -- machine ID --.

In column 17 at line 64, plese delete " is the time " and insert -- [time] is the time --.

Signed and Sealed this

Sixteenth Day of September, 1997

BRUCE LEHMAN

*Attest:*

*Attesting Officer*          *Commissioner of Patents and Trademarks*

UNITED STATES PATENT AND TRADEMARK OFFICE
CERTIFICATE OF CORRECTION

PATENT NO. : 5,095,423

DATED : March 10, 1992

INVENTOR(S) : Gramlich et al.

It is certified that error appears in the above-identified patent and that said Letters Patent is hereby corrected as shown below:

In column 1 at line 44 and column 2 at line 45, please delete " data base " and insert -- database --.

In column 3 at line 1-2, please delete " component file is located, because the file name is unique for a particular ".

In column 3 at line 55, please delete " 5a and 5b 5c " and insert -- 5a, 5b, and 5c --.

In column 4 at line 11, please delete " with " and insert -- within --.

In column 4 at line 56-57, please delete " provide " and insert -- prove --.

In column 6 at line 8 (both occurrences) and 11, column 9 at line 9, column 12 at lines 17-18 (both occurrences), column 13 at line 54 and 55, and column 14 at line 63, please delete " database " and insert -- " --.

In column 6 at line 51, please delete " the " and insert -- The --.

In column 6 at line 59, please delete " table" 410 " and insert -- contains the name of the symbols and the location of the symbol in the "semantic table section " 410.

UNITED STATES PATENT AND TRADEMARK OFFICE
CERTIFICATE OF CORRECTION

PATENT NO. : 5,095,423
DATED : March 10, 1992
INVENTOR(S) : Gramlich et al.

It is certified that error appears in the above-identified patent and that said Letters Patent is hereby corrected as shown below:

In column 9 at line 33, please delete " the (first occurrence) " and insert -- then --.

In column 10 at line 5, please delete " lie " and insert -- line --.

In column 10 at lines 49 & 50, delete " 5a and 5b" and insert -- 5a, 5b, and 5c --.

In column 11 at line 1, please delete "Fig. 5b illustrates" and insert -- Figures 5b and 5c illustrate--

In column 11 at line 9, please delete " the " and insert -- the index --.

In column 12 at line 59, please delete " ti ".

In column 12 at line 61, please delete " use " and insert -- used --.

In column 12 at line 64, please delete " THE " and insert -- The --.

In column 13 at line 6, please delete "=" and insert -- < --.

UNITED STATES PATENT AND TRADEMARK OFFICE
CERTIFICATE OF CORRECTION

PATENT NO. : 5,095,423
DATED : March 10, 1992
INVENTOR(S) : Gramlich et al.

It is certified that error appears in the above-identified patent and that said Letters Patent is hereby corrected as shown below:

In column 15 at line 26, please delete " value " and insert -- value generated and the database component file name generated using the hash value --.

In column 15 at line 31, please delete " crated " insert -- created --.

In column 15 at line 39, please start a new paragraph after " IP ."

In column 16 at line 6, please delete " names " and insert -- named --.

In column 17 at line 63, please delete " machine " and insert -- machine ID --.

In column 17 at line 64, plese delete " is the time " and insert -- [time] is the time --.

This certificate supersedes Certificate of Correction issued September 16, 1997.

Signed and Sealed this

Third Day of March, 1998

Attest:

BRUCE LEHMAN

Attesting Officer

Commissioner of Patents and Trademarks